US009235087B2

(12) United States Patent
Li et al.

(10) Patent No.: US 9,235,087 B2
(45) Date of Patent: Jan. 12, 2016

(54) ACTIVE MATRIX STRUCTURE AND LIQUID CRYSTAL DISPLAY PANEL (71) Applicant: Himax Display, Inc., Tainan (TW)

(72) Inventors: Yuet-Wing Li, Tainan (TW); Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 22 days.

(21) Appl. No.: 14/205,387

(22) Filed: Mar. 12, 2014

(65) Prior Publication Data

US 2015/0002795 A1    Jan. 1, 2015

Related U.S. Application Data (60) Provisional application No. 61/839,874, filed on Jun. 27, 2013.

(51) Int. Cl.
G02F 1/1335 (2006.01)
G02F 1/1343 (2006.01)
G02F 1/1362 (2006.01)

(52) U.S. Cl.
CPC .... *G02F 1/134309* (2013.01); *G02F 1/133553* (2013.01); *G02F 1/136277* (2013.01); *G02F 1/136227* (2013.01); *G02F 2001/136222* (2013.01); *G02F 2201/40* (2013.01)

(58) Field of Classification Search
CPC .................. G02F 1/134309; G02F 1/136277; G02F 1/136227; G02F 1/133553; G02F 2201/40

USPC .......................................... 349/106, 109, 146
See application file for complete search history.

(56) References Cited

U.S. PATENT DOCUMENTS

| 7,450,202 | B2* | 11/2008 | Tsuchiya ................. 349/114 |
| 8,416,373 | B2  | 4/2013  | Li et al. |
| 2006/0109412 | A1* | 5/2006 | Hsiao et al. .............. 349/146 |
| 2006/0221267 | A1  | 10/2006 | Bell et al. |
| 2008/0018630 | A1* | 1/2008  | Fujino ...................... 345/205 |
| 2008/0303993 | A1  | 12/2008 | Kuo et al. |
| 2010/0096988 | A1* | 4/2010  | Kitabayashi et al. ........ 315/51 |
| 2012/0257149 | A1  | 10/2012 | Li et al. |

FOREIGN PATENT DOCUMENTS

| JP | 2010060901 | 3/2010 |
| JP | 2013029838 | 2/2013 |
| TW | 200617544 | 6/2006 |

(Continued)

OTHER PUBLICATIONS

"Office Action of Japan Counterpart Application", issued on Apr. 21, 2015, p. 1-p. 5, in which the listed references were cited.

(Continued)

*Primary Examiner* — Nathanael R Briggs
(74) *Attorney, Agent, or Firm* — J.C. Patents (57) ABSTRACT An active matrix structure including a substrate, a plurality of active devices, and a plurality of pixel electrodes is provided. The active devices are disposed on the substrate. The pixel electrodes are respectively electrically connected to the active devices and arranged in an array. The active matrix structure has a display area, and each of the pixel electrodes has at least one slanted side inclined with respect to all sides of the display area. A liquid crystal display panel is also provided.

18 Claims, 6 Drawing Sheets

(56) References Cited

FOREIGN PATENT DOCUMENTS

| | | |
|---|---|---|
| TW | 200848892 | 12/2008 |
| TW | 201241515 | 10/2012 |

OTHER PUBLICATIONS

"Office Action of Taiwan Counterpart Application", issued on Jul. 6, 2015, p. 1-p. 11, in which the listed references were cited.

* cited by examiner

ACTIVE MATRIX STRUCTURE AND LIQUID CRYSTAL DISPLAY PANEL

CROSS-REFERENCE TO RELATED APPLICATION

This application claims the priority benefits of U.S. provisional application Ser. No. 61/839,874, filed on Jun. 27, 2013. The entirety of the above-mentioned patent application is hereby incorporated by reference herein and made a part of this specification.

BACKGROUND OF THE INVENTION

1. Field of the Invention

The invention generally relates to an electronic device and a display panel and, in particular, to an active matrix structure and a liquid crystal display panel.

2. Description of Related Art

In the display region of a display device, various types of spatial light modulators are applied to convert an illumination beam into an image beam, for example, transmissive liquid crystal display (LCD) panels, liquid-crystal-on-silicon (LCOS) panels, or digital micro-mirror devices (DMDs). The light efficiency of a transmissive LCD panel is less than that of a LCOS panel, and the cost of a DMD is greater than that of a LCOS panel.

Generally, in a projector using the LCOS panel, an s-polarized beam is reflected by a polarizing beam splitter (PBS) to the LCOS panel. Then, the LCOS panel modulates the s-polarized beam into a polarized beam with other polarization states, and reflects the polarized beam to the PBS. The PBS filters the polarized beam into an image beam, which is then transmitted to an image-forming lens. Finally, the image-forming lens projects the image beam onto a screen to form an image on the screen or forms a virtual image in the air or on any other virtual image plane.

When the size of the LCOS panel is reduced, the gap between two adjacent pixel electrodes is reduced and the aperture ratio of the pixel electrodes is also reduced. Consequently, a fringe field problem of the pixel electrodes becomes more seriously; for example, a liquid crystal orientation around a corner of the pixel electrode may be not correct, so that the optical efficiency and the color performance of the LCOS panel are reduced.

SUMMARY OF THE INVENTION

Accordingly, the invention is directed to an active matrix, which reduces a fringe field problem of pixel electrodes.

The invention is directed to a liquid crystal display panel, which reduces a fringe field problem of pixel electrodes.

According to an embodiment of the invention, an active matrix structure including a substrate, a plurality of active devices, and a plurality of pixel electrodes is provided. The active devices are disposed on the substrate. The pixel electrodes are respectively electrically connected to the active devices and arranged in an array. The active matrix structure has a display area, and each of the pixel electrodes has at least one slanted side inclined with respect to all sides of the display area.

According to an embodiment of the invention, a liquid crystal display panel including the aforementioned active matrix structure, an opposite substrate, and a liquid crystal layer is provided. The opposite substrate includes a transparent substrate and a transparent conductive layer. The transparent conductive layer is disposed on the transparent substrate and between the active matrix structure and the transparent substrate. The liquid crystal layer is disposed between the active matrix structure and the opposite substrate.

In the active matrix structure and the liquid crystal display panel according to embodiments of the invention, since each of the pixel electrodes has at least one slanted side inclined with respect to all sides of the display area, a fringe field effect of the pixel electrodes is compensated. As a result, the fringe field problem of pixel electrodes is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
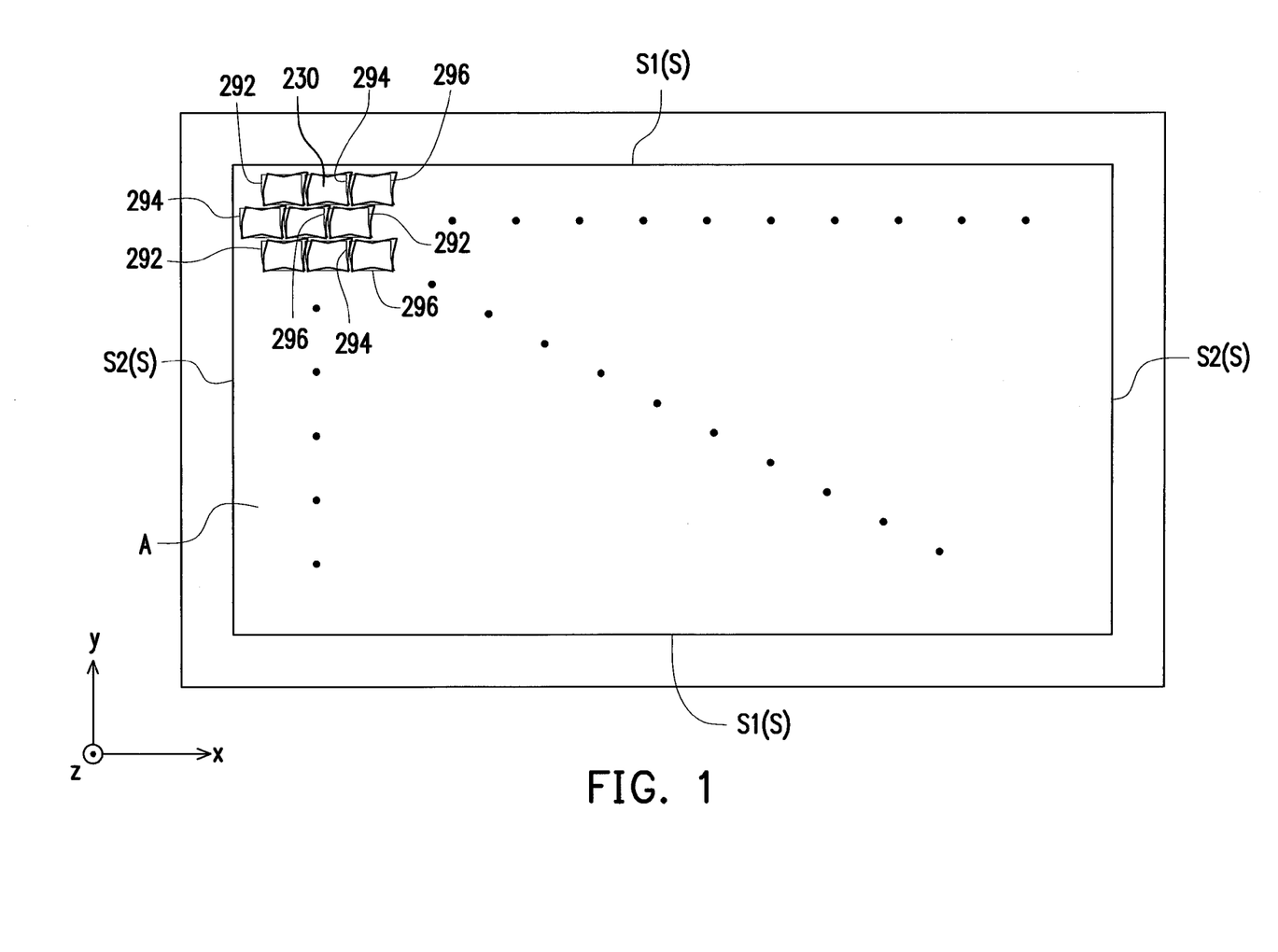
FIG. 1 is a schematic front view of a liquid crystal display panel according to an embodiment of the invention.
Figure 2:
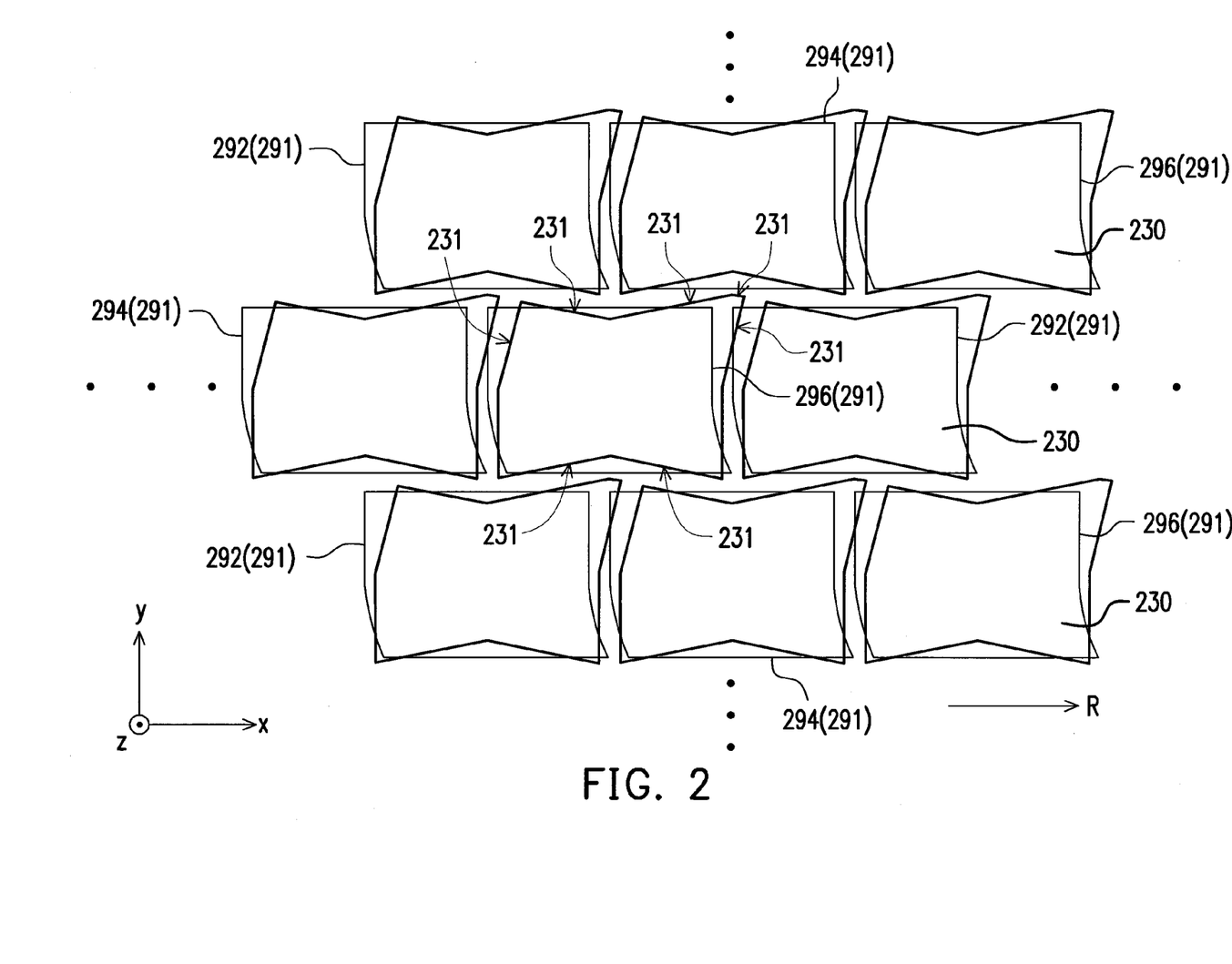
FIG. 2 is a schematic enlarged view of the liquid crystal display in FIG. 1, showing a front view of pixel electrodes and filter areas of the liquid crystal display in FIG. 1.
Figure 3:
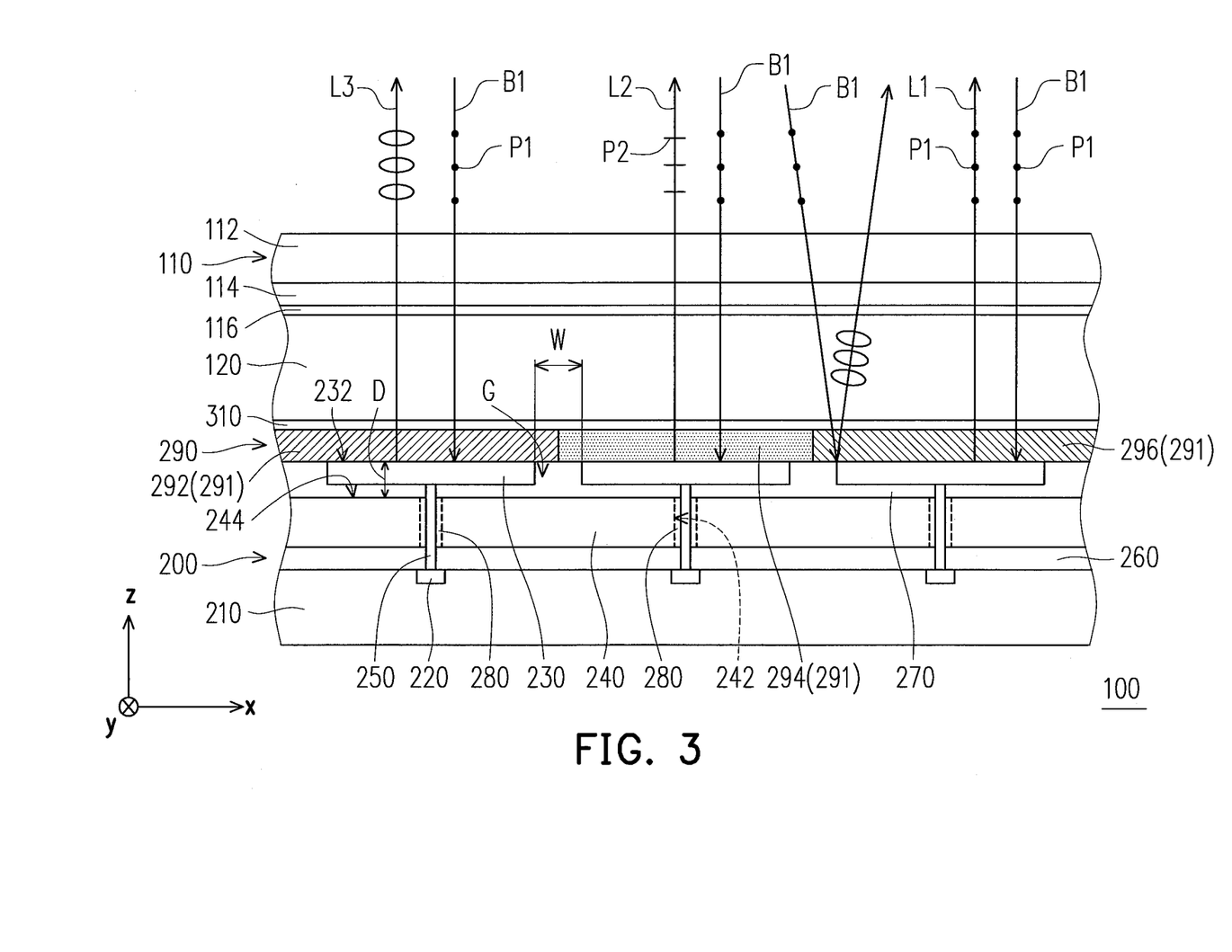
FIG. 3 is a schematic cross-sectional view of the liquid crystal display in FIG. 1.
Figure 4:
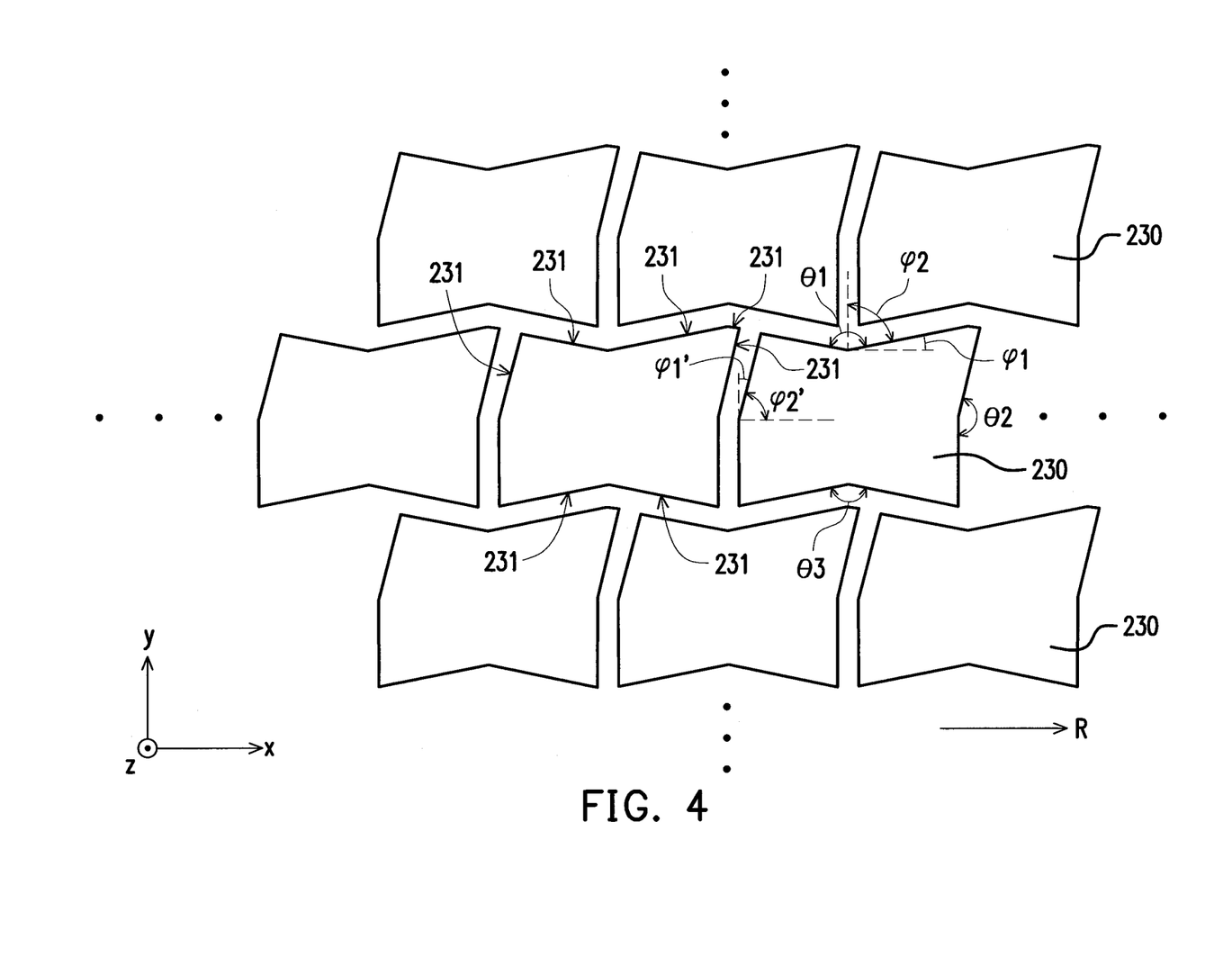
FIG. 4 is a front view of the pixel electrodes in FIG. 2.
Figure 5:
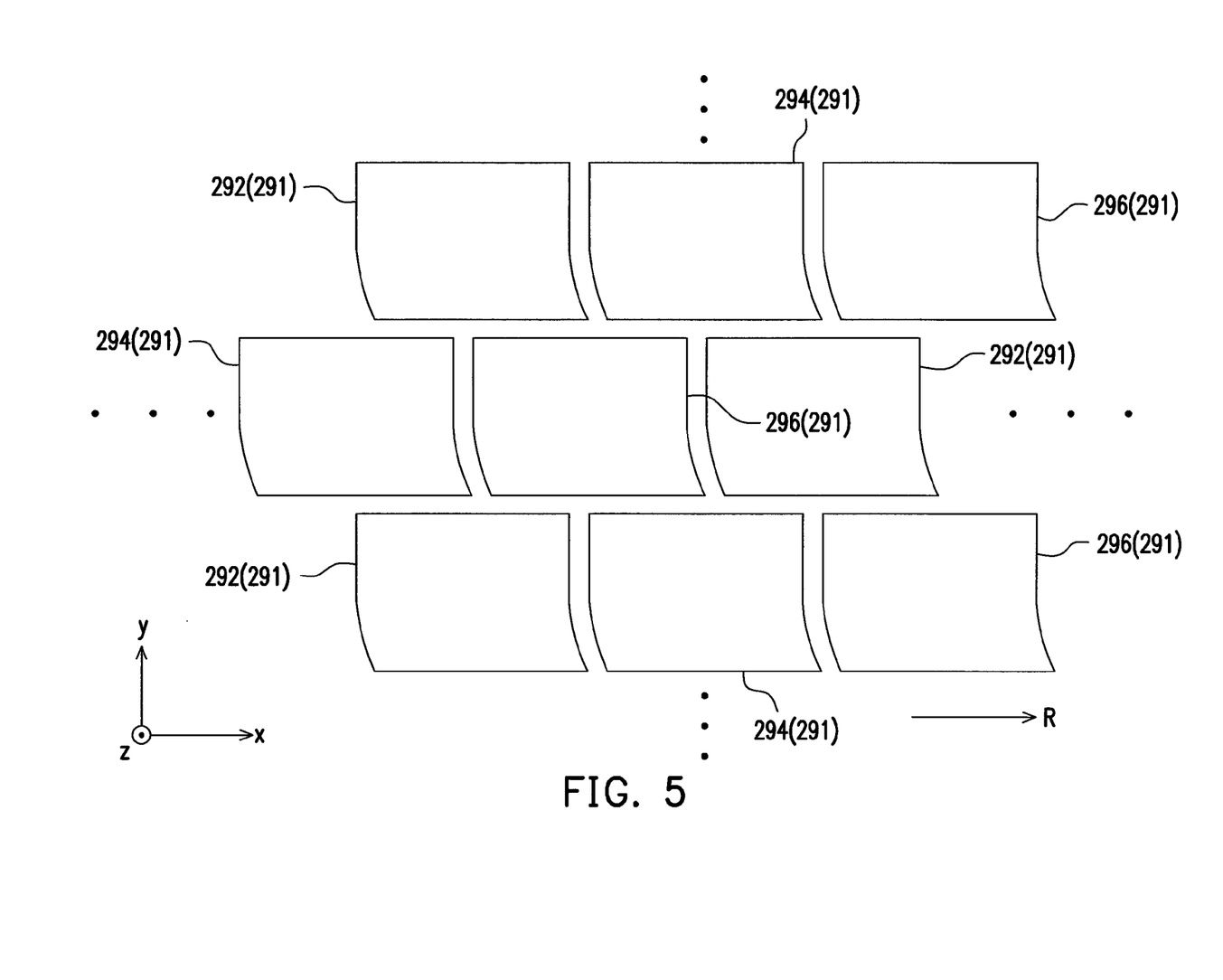
FIG. 5 is a front view of the filter areas in FIG. 2.

FIG. 1 is a schematic front view of a liquid crystal display panel according to an embodiment of the invention. FIG. 2 is a schematic enlarged view of the liquid crystal display in FIG. 1, showing a front view of pixel electrodes and filter areas of the liquid crystal display in FIG. 1. FIG. 3 is a schematic cross-sectional view of the liquid crystal display in FIG. 1. FIG. 4 is a front view of the pixel electrodes in FIG. 2. FIG. 5 is a front view of the filter areas in FIG. 2. Referring to FIGS. 1-5, the liquid crystal display panel 100 in this embodiment includes an active matrix structure 200, an opposite substrate 110, and a liquid crystal layer 120. The active matrix structure 200 includes a substrate 210, a plurality of active devices 220, and a plurality of pixel electrodes 230. The active devices 220 are disposed on the substrate 210. In this embodiment, the substrate 210 is a silicon substrate, and the active devices 220 are transistors. In this embodiment, the active devices 220 are electrically connected to a plurality of scan lines and a plurality of data lines on the substrate 210, and each of the active devices is electrically connected to one scan line and one data line.

The pixel electrodes 230 are respectively electrically connected to the active devices 220 and arranged in an array. In this embodiment, the pixel electrodes are reflective electrodes. The pixel electrodes may be metal electrodes. In some embodiments, the pixel electrodes are made of aluminum.

The opposite substrate 110 includes a transparent substrate 112 and a transparent conductive layer 114. The transparent conductive layer 114 is disposed on the transparent substrate 112 and between the active matrix structure 200 and the transparent substrate 112. The liquid crystal layer 120 is disposed between the active matrix structure 200 and the opposite substrate 110. The transparent substrate 112 may be made of glass or plastic, and the transparent conductive layer 114 may be made of indium tin oxide or any other appropriate transparent conductive material.

The active matrix structure 200 has a display area A, and each of the pixel electrodes 230 has at least one slanted side 231 inclined with respect to all sides S of the display area A (a plurality of slanted sides 231 are exemplarily shown in FIG. 2). In this embodiment, each of the pixel electrodes 230 has a shape of a concave polygon, for example, a butterfly-shaped polygon. The concave polygon has at least one interior angle greater than 180 degrees. For example, the interior angles θ1, θ2, and θ3 in FIG. 4 are greater than 180 degrees.

In the active matrix structure 200 and the liquid crystal display panel 100 in this embodiment, since each of the pixel electrodes 230 has at least one slanted side 231 inclined with respect to all sides S of the display area A, a fringe field of the pixel electrodes 230, i.e. the electric field around the edge of the pixel electrodes 230, is changed to compensate the fringe field effect due to conventional rectangular pixel electrodes with slanted sides respectively parallel to the sides of the display A. Consequently, orientations of liquid crystals around the edge of the pixel electrodes 230 can satisfy a predetermined requirement. As a result, the fringe field problem of pixel electrodes 230 is reduced or prevented. In other words, the electrical field of the pixel electrode 230 drives the liquid crystals in the liquid crystal layer 120 within a more regular region.

In this embodiment, each of the pixel electrodes 230 has a shape of a polygon, and the polygon has more than four sides. For example, each of the pixel electrodes 230 in FIG. 4 has 9 sides, but the invention is not limited thereto.

In this embodiment, the display area A is rectangular-shaped, and at least two sides S of the display area (e.g. the two sides S1 shown in FIG. 1) are substantially parallel to an arrangement direction R of the pixel electrodes 230 In this embodiment, the pixel electrodes 230 are in a delta arrangement. However, in other embodiments, the pixel electrodes 230 may be arranged in any other appropriate manner.

When a linearly polarized beam B1 having a first polarization direction P1 (e.g. the y direction shown in FIGS. 1 and 3) enters the liquid crystal display panel 100, the liquid crystal display panel 100 may reflect the linearly polarized beam B1 into at least one of a linearly polarized light L1 having the first polarization direction P1, a linearly polarized light L2 having a second polarization direction P2 (e.g. the x direction shown in FIGS. 1 and 3), an elliptically polarized light L3, and a circularly polarized light (not shown) depending on the orientation distribution of liquid crystals in the liquid crystal layer 120. In this embodiment, the liquid crystal display panel 100 is a liquid-crystal-on-silicon (LCOS) panel. Moreover, the x direction is parallel to the side S1 of the display area A, the y direction is parallel to the side S2 of the display area A, the z direction is perpendicular to the display area A, and the x, y, z directions are perpendicular to each other.

When the linearly polarized beam B1 is incident on the slanted sides 231 of the pixel electrodes 230, since the slanted sides 231 are inclined, the linearly polarized beam B1 is reflected and depolarized by the slanted sides 231. For example, the linearly polarized beam B1 may be reflected into an elliptically polarized light. Moreover, when the linearly polarized beam B1 is converted by liquid crystals into a circularly polarized beam which is then incident on the slanted sides 231, since the slanted sides 231 are inclined, the circularly polarized beam may be reflected and depolarized by the slanted sides 231 into an elliptically polarized light.

The depolarization may reduce display performance due to, for example, light leakage. As a result, in this embodiment, each of the slanted sides 231 has a plurality of inclined angles (e.g. $\phi1$ and $\phi2$; or $\phi1'$ and $\phi2'$) respectively with respect to the sides S of the display area, and a minimum of the inclined angles (e.g. $\phi1$ selected from $\phi1$ and $\phi2$; or $\phi1'$ selected from $\phi1'$ and $\phi2'$) is less than or equal to 10 degrees. In this condition, the light leakage is negligible, the contrast and reflectance is preserved, and the fringe field problem is effectively reduced, so that the display performance of the liquid crystal display panel 100 is improved.

In this embodiment, the active matrix structure 200 further includes a reflective layer 240 disposed between the substrate 210 and the pixel electrodes 230. The reflective layer 240 may be a metal layer, e.g. an aluminum layer, and reflects light penetrates through the gap G, so as to increase the light efficiency of the active matrix structure 200 and the liquid crystal display panel 100. In this embodiment, the reflective layer 240 has a plurality of via holes 242, and a plurality of conductive elements 250 respectively penetrates the via holes 242 and respectively connects the pixel electrodes 230 with the active devices 220. Moreover, the active matrix structure 200 may includes an insulation layer 260 isolating the reflective layer 240 from the substrate 210, an insulation layer 270 isolating the pixel electrodes 230 from the reflective layer 240, and a plurality of insulation layers 280 respectively isolating the conductive elements 250 from the reflective layer 240.

In this embodiment, the gap G between any two adjacent pixel electrodes 230 has a width W ranging from 0.2 microns to 0.35 microns. In other words, the gap G may be small, and the aperture ratio of the pixel electrodes 230 is increased, so as to improve the light efficiency and brightness of the liquid crystal display panel 100.

In this embodiment, the active matrix structure 200 further includes a color filter layer 290 disposed on the pixel electrodes 230. The color filter layer 290 includes plural sets of filter areas 291 with different colors, for example, red filter areas 292, green filter areas 294, and blue filter areas 296. The red filter areas 292, the green filter areas 294, and the blue filter areas 296 are arranged alternately over the pixel electrodes 230, for example, in the delta arrangement or any other arrangement. The filter areas 291 respectively correspond to the pixel electrodes 230, and the shape of each of the filter areas 291 conforms to a fringe field distribution range of the corresponding pixel electrode 230, which has been described in U.S. Pat. No. 8,416,373 (application Ser. No. 13/192,855), and the entirety of U.S. Pat. No. 8,416,373 is hereby incorporated by reference herein and made a part of this specification.

In this embodiment, each of the filter areas 291 may overlap with the corresponding pixel electrode 230 and at least one another pixel electrode 230 adjacent to the corresponding pixel electrode 230 since the shape of the fringe field distribution range is different from that of the corresponding pixel electrode 230.

Moreover, in this embodiment, the distance D between a surface 244 of the reflective layer 240 facing away from the substrate 210 and a surface 232 of each of the pixel electrodes 230 facing away from the substrate 210 ranges from 0.18 microns to 0.22 microns. The distance D may determine the degree of interference between the light reflected by the reflective layer 240 and the light reflected by the pixel electrodes 230, and determine the reflectance spectrum of the active matrix structure 200. When the distance D ranges from 0.18 microns to 0.22 microns, the reflectance spectrum is suitable for the color filter layer 290, thereby increasing the color performance of the liquid crystal display panel 100. In this embodiment, since the fringe field problem is reduced or prevented, the color-to-white ratio of the liquid crystal display panel 100 is improved. Therefore, the pixel dimension may be reduced without adversely affecting the color performance of the liquid crystal display panel 100.

In one embodiment, the pixel electrodes 230 corresponding to the filter areas 291 with different colors have different sizes. Specifically, each of the pixel electrodes 230 corresponds to a sub-pixel. In this embodiment, each of the pixels of the liquid crystal display panel 100 includes a red sub-pixel corresponding to the red filter area 292, a green sub-pixel corresponding to the green filter area 294, and a blue sub-pixel corresponding to the blue filter area 296. The size of the pixel electrode 230 corresponding to the red sub-pixel, the size of the pixel electrode 230 corresponding to the green sub-pixel, and the size of the pixel electrode 230 corresponding to the red sub-pixel may be different from one another or partially the same. Alternatively, in other embodiments, the pixel electrodes 230 corresponding to the filter areas 291 with different colors may be in the same size. The size adjustment of the sub-pixels with different colors may satisfy the color requirement for the liquid crystal display panel 100.

In this embodiment, the liquid crystal display panel 100 further includes a first alignment layer 310 disposed between the color filter layer 290 and the liquid crystal layer 120 and a second alignment layer 116 disposed between the transparent conductive layer 114 and the liquid crystal layer 120. The first alignment layer 310 and the second alignment layer 116 are configured to align the liquid crystals in the liquid crystal layer 120.

Figure 6:
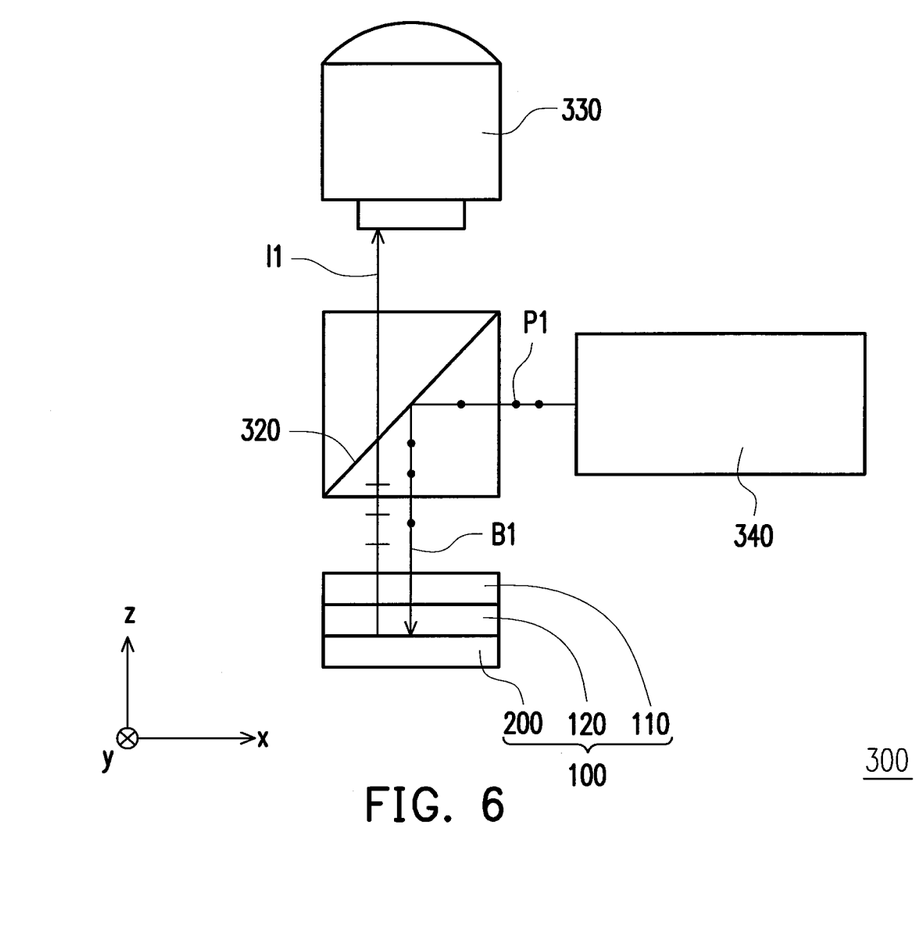
FIG. 6 is a schematic view of a projector according to an embodiment of the invention.

FIG. 6 is a schematic view of a projector according to an embodiment of the invention. Referring to FIGS. 3 and 6, the projector 300 in this embodiment includes the aforementioned liquid crystal display panel 100, an illumination system 340, a polarizing beam splitter (PBS) 320, and an image-forming lens 330. The illumination system 340 may provide the linearly polarized beam B1 with the first polarization direction P1 (e.g. an s-polarized beam), and the PBS 320 reflects the linearly polarized beam B1 to the liquid crystal display panel 110. The liquid crystal display panel 100 reflects and converts the linearly polarized beam B1 into an image beam I1 with the second polarization direction P2 (e.g. a p-polarized beam), and the image beam I1 then penetrates through the PBS 320 and is transmitted to the image-forming lens 330. The image-forming lens 330 projects the image beam I1 onto a screen or an object to form a real image on the screen or the object, or the image-forming lens 330 forms a virtual image in the air or a virtual image plane.

In other embodiments, the PBS 320 may also be replaced by a reflective polarizer. Moreover, in other embodiments, the illumination system 340 may provide a linearly polarized beam with a polarization direction parallel to the sides S1 of the display area A.

In conclusion, in the active matrix structure and the liquid crystal display panel according to the embodiments of the invention, since each of the pixel electrodes has at least one slanted side inclined with respect to all sides of the display area, a fringe field effect of the pixel electrodes is compensated. As a result, the fringe field problem of pixel electrodes is reduced.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An active matrix structure comprising:
   a substrate;
   a plurality of active devices disposed on the substrate;
   a plurality of pixel electrodes respectively electrically connected to the plurality of active devices and arranged in an array, wherein the active matrix structure has a display area, and each of the plurality of pixel electrodes has at least one slanted side inclined with respect to all sides of the display area; and
   a color filter layer disposed on the plurality of pixel electrodes, the color filter layer comprising plural sets of filter areas with different colors, wherein a filter area of the plural sets of filter areas respectively correspond to a pixel electrode of the plurality of pixel electrodes, and a shape of the filter area of the plural sets of filter areas conforms to a fringe field distribution range of the corresponding pixel electrode of the plurality of pixel electrodes.

2. The active matrix structure according to claim 1, wherein the each of the plurality of pixel electrodes has a shape of a concave polygon.

3. The active matrix structure according to claim 1, wherein the each of the plurality of pixel electrodes has a shape of a polygon, and the polygon has more than four sides.

4. The active matrix structure according to claim 1, wherein the display area is rectangular-shaped, and at least two sides of the display area are substantially parallel to an arrangement direction of the plurality of pixel electrodes.

5. The active matrix structure according to claim 1, wherein the slanted side has a plurality of inclined angles respectively with respect to the sides of the display area, and a minimum of the inclined angles is less than or equal to 10 degrees.

6. The active matrix structure according to claim 1 wherein the plurality of pixel electrodes corresponding to the plural sets of filter areas with different colors has different sizes.

7. The active matrix structure according to claim 1, wherein a gap between any two adjacent pixel electrodes of the plurality of pixel electrodes has a width ranging from 0.2 microns to 0.35 microns.

8. The active matrix structure according to claim 1 further comprising a reflective layer disposed between the substrate and the plurality of pixel electrodes, wherein a distance between a surface of the reflective layer facing away from the substrate and a surface of the each of the plurality of pixel electrodes facing away from the substrate ranges from 0.18 microns to 0.22 microns.

9. The active matrix structure according to claim 1, wherein the substrate is a silicon substrate, and the plurality of pixel electrodes are reflective electrodes.

10. A liquid crystal display panel comprising:
    an active matrix structure comprising:
    a substrate;
    a plurality of active devices disposed on the substrate;
    a plurality of pixel electrodes respectively electrically connected to the plurality of active devices and arranged in an array, wherein the active matrix structure has a display area, and each of the plurality of pixel electrodes has at least one slanted side inclined with respect to all sides of the display area; and
    a color filter layer disposed on the plurality of pixel electrodes, the color filter layer comprises a plurality of sets of filter areas with different colors, a filter area of the plurality of sets of filter areas respectively corresponds to a pixel electrode of the plurality of pixel electrodes, and a shape of the filter area of the plurality of sets of filter areas conforms to a fringe field distribution range of the corresponding pixel electrode of the plurality of pixel electrodes;

an opposite substrate comprising:

a transparent substrate; and a transparent conductive layer disposed on the transparent substrate and between the active matrix structure and the transparent substrate; and a liquid crystal layer disposed between the active matrix structure and the opposite substrate.

11. The liquid crystal display panel according to claim 10, wherein the each of the plurality of pixel electrodes has a shape of a concave polygon.

12. The liquid crystal display panel according to claim 10, wherein the each of the plurality of pixel electrodes has a shape of a polygon, and the polygon has more than four sides.

13. The liquid crystal display panel according to claim 10, wherein the display area is rectangular-shaped, and at least two sides of the display area are substantially parallel to an arrangement direction of the plurality of pixel electrodes.

14. The liquid crystal display panel according to claim 10, wherein the slanted side has a plurality of inclined angles respectively with respect to the sides of the display area, and a minimum of the inclined angles is less than or equal to 10 degrees.

15. The liquid crystal display panel according to claim 10, wherein the plurality of pixel electrodes corresponding to the plurality of sets of filter areas with different colors has different sizes.

16. The liquid crystal display panel according to claim 10, wherein a gap between any two adjacent pixel electrodes of the plurality of pixel electrodes has a width ranging from 0.2 microns to 0.35 microns.

17. The liquid crystal display panel according to claim 10, wherein the active matrix structure further comprises a reflective layer disposed between the substrate and the pixel electrodes, and wherein a distance between a surface of the reflective layer facing away from the substrate and a surface of the each of the plurality pixel electrodes facing away from the substrate ranges from 0.18 microns to 0.22 microns.

18. The liquid crystal display panel according to claim 10, wherein the substrate is a silicon substrate, and the pixel electrodes are reflective electrodes.

* * * * *